(12) United States Patent
Bollin et al.

(10) Patent No.: US 9,403,536 B2
(45) Date of Patent: Aug. 2, 2016

(54) DRIVER ASSISTANCE SYSTEM (71) Applicant: DEERE & COMPANY, Moline, IL (US)

(72) Inventors: Douglas J. Bollin, Kaiserslautern (DE); Hanke Bösch, Tiefenthal (DE); Anja Eggerl, Dresden (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/330,038

(22) Filed: Jul. 14, 2014

(65) Prior Publication Data
US 2015/0046043 A1 Feb. 12, 2015

Related U.S. Application Data (60) Provisional application No. 61/865,124, filed on Aug. 12, 2013.

(51) Int. Cl.
*B60W 50/08* (2012.01)
*A01D 41/127* (2006.01)
*G05B 13/02* (2006.01)

(52) U.S. Cl.
CPC ............ *B60W 50/08* (2013.01); *A01D 41/127* (2013.01); *G05B 13/021* (2013.01)

(58) Field of Classification Search
CPC .... B60W 50/08; G05B 13/021; A01D 41/127
USPC .......................................... 701/50
See application file for complete search history.

(56) References Cited

U.S. PATENT DOCUMENTS

| | | | | |
|---|---|---|---|---|
| 5,951,395 A | * | 9/1999 | Peter .................. | A01D 41/1273 460/119 |
| 6,726,559 B2 | * | 4/2004 | Bischoff .............. | A01D 41/127 460/1 |
| 8,406,964 B2 | | 3/2013 | Baumgarten et al. | |
| 8,935,060 B2 | * | 1/2015 | Baumgarten ........ | A01D 41/127 460/114 |
| 9,002,594 B2 | * | 4/2015 | Wilken ................. | G05B 11/06 56/10.1 |
| 9,125,344 B2 | * | 9/2015 | Baumgarten .......... | G06Q 10/04 |
| 2003/0066277 A1 | * | 4/2003 | Behnke ................. | A01D 41/127 56/10.2 R |
| 2005/0004737 A1 | * | 1/2005 | Fitzner ................. | A01D 41/127 701/50 |
| 2005/0137003 A1 | * | 6/2005 | Behnke ................ | A01D 41/1276 460/1 |
| 2012/0004812 A1 | | 1/2012 | Baumgarten et al. | |

FOREIGN PATENT DOCUMENTS

| | | |
|---|---|---|
| DE | 10147733 A1 | 4/2003 |
| EP | 2165591 A1 | 3/2010 |
| EP | 2728523 A1 | 5/2014 |

OTHER PUBLICATIONS

European Search Report issued in counterpart application No. 14178854.7, dated Mar. 2, 2015 (9 pages).

* cited by examiner

*Primary Examiner* — McDieunel Marc
*Assistant Examiner* — James E Stroud (57) ABSTRACT

A driver assistance system for a combine harvester includes an ALU configured to receive two or more desired areas of improvement from an operator, and to calculate at least one control action that will improve the two or more areas of improvement.

11 Claims, 9 Drawing Sheets

DRIVER ASSISTANCE SYSTEM

FIELD OF THE INVENTION

This invention relates to the driver assistance system for agricultural working machines.

BACKGROUND OF THE INVENTION

DE 101 47 733 disclosed a driver assistance system that supports the operator of an agricultural working machine in the optimization of the working parameters of the working mechanisms. The driver assistance system includes a visual display unit as well as an arithmetic logic unit for processing various sensor signals. The agricultural working machine, which is designed as a combine harvester, includes a large number of working mechanisms, e.g., a header, a threshing mechanism, separating mechanisms, and at least one cleaning mechanism, which are coupled to a large number of sensing mechanisms capable of detecting working parameters of the working mechanisms as well as efficiency parameters of the agricultural working machine, such as grain loss, grain quality, and tailings quantity.

The information that is ascertainable using the sensing mechanisms is forwarded to the central arithmetic logic unit which derives information from these signals that may be visualized in the display device. The visualized information includes working parameters of the agricultural working machine, such as cylinder speed, cleaning fan speed, crop material throughput, and concave width, as well as efficiency parameters such as the grain loss from the cleaning and separating mechanisms. To optimize the various working parameters, a method is provided in DE 101 47 733, in which, in a first method step, the operator guides the agricultural working machine through the stand to be harvested at a ground speed that is appropriate for the expected crop material throughput, thereby ensuring that the combine harvester is acted upon by an approximately consistent quantity of crop material within a certain time period. The operator must wait until the combine harvester has reached a state of equilibrium in which an approximately consistent, good or bad working result is attained. This working result is recorded, and it is visualized to the operator in the display unit. If the working result is unsatisfactory, the operator of the combine harvester makes repeated changes to a promising working parameter of a working mechanism, and, each time, waits for the combine harvester to reach a state of equilibrium using the modified working parameter. All of the working results are recorded as a function of time, thereby enabling the operator to identify the specific value of the working parameter at which the best working result was attained. This specific value is then used to adjust the particular working mechanism, thereby ensuring that an improved working result of the agricultural working machine is ultimately attained.

A method of this type has the main disadvantage that a relatively long period of time is required before the various working parameters of the combine harvester function within an optimized parameter range, since the disclosed adjustment procedure must be implemented for every working parameter. In addition, in the case of an adjustment method structured in this manner, performing optimization rapidly and successfully is dependent on the level of knowledge of the operator of the agricultural working machine, since the various working parameters influence one another via highly complex interactions.

U.S. Pat. No. 8,406,964 disclosed a driver assistance system for an agricultural working machine such as that disclosed in DE 101 47 733 that is interactive using natural language on a visual display connected to an arithmetic logic unit. The system displays a sequence of information screens to assist the operator in identifying operating efficiency parameters that need improvement.

In the system, the operator identifies an operating efficiency that the operator wishes to improve, such as grain loss, grain quality, or tailings quantity. On a subsequent screen, the driver assistance system responsively suggests one or more quality criteria. These quality criteria are based upon the operating efficiency selected by the operator. The operator responsively selects one of the quality criteria. In response to this selection, the driver assistance system works through a critical solution path and determines a new setting of a parameter of a working mechanism and suggests this new setting to the operator. If the operator accepts the setting, the driver assistance system then commands the working mechanism to the new setting and waits for the system to reach a steady state. Once the system has reached a steady state, the system then asks the operator whether the system is operating satisfactorily. If the operator indicates that the system is not operating satisfactorily, the driver assistance system checks to determine whether any further proposed solutions exist and, if so, suggests that an alternative working parameter be optimized.

One drawback of this driver assistance system is that the system is responsive to only one quality criterion. In many cases, the operator is aware of and would otherwise wish to optimize a plurality of quality criteria simultaneously. However, since only one quality criterion can be presented to the driver assistance system at one time, it is impossible to optimize more than one quality criterion at a time. As a result, the driver must sequentially optimize different quality criteria rather than simultaneously optimizing for several quality criteria. This delays the optimization of the agricultural working machine and takes driver attention away from (in this case) the harvesting process.

The object of the present invention, therefore, is to avoid the disadvantages of the related art described above and, in particular, to provide a driver assistance system for optimizing the efficiency of an agricultural working machine which ensures that the agricultural working machine reaches an optimized operating state within the shortest amount of time possible.

SUMMARY OF THE INVENTION

In accordance with a first aspect of the invention, a driver assistance system for a combine harvester includes an ALU configured to accept a plurality of general and/or specific items related to harvested crop selected for improvement by an operator, and to calculate at least one control action based upon the plurality of items selected for improvement.

In accordance with a second aspect of the invention, a method for operating a driver assistant system for a combine harvester includes electronically offering a plurality of general and/or specific items related to harvested crop from which an operator may select one or more items for improvement, electronically receiving a selected plurality of the items related to harvested crop for improvement from the operator, and electronically determining at least one control action based upon the selected plurality of the items related to harvested crop for improvement.

In accordance with a third aspect of the invention, a driver assistance system for a combine harvester comprises a display; a plurality of working mechanisms; a plurality of sensors; an arithmetic logic unit coupled to the plurality of working mechanisms, the plurality of sensors and the display; wherein the arithmetic logic unit is configured to electronically accept a plurality of general and/or specific items related to harvested crop for improvement selected by an operator of the combine harvester, with the general items for improvement including grain quality, grain loss and straw condition, and with the specific items for improvement falling within respective ones of the general items for improvement and including broken grain, chaff/husks, straw pieces/cobs, unthreshed material, excess tailings, separator loss, shoe loss and unthreshed loss; wherein the arithmetic logic unit is configured to determine at least one control action that the arithmetic logic unit calculates will improve the plurality of items for improvement selected by the operator.

The at least one control action may comprise a plurality of control actions, and the arithmetic logic unit may be configured to prioritize individual control actions of the plurality of control actions based upon a degree to which the individual control actions will improve more of the plurality of items selected by the operator for improvement.

The arithmetic logic unit may be configured to simultaneously present on the display the plurality of items for improvement previously selected by the operator.

The arithmetic logic unit may be configured to present resolution criteria for each of the plurality of items for improvement on the display.

The resolution criteria may include visual indicia indicating improvement of the items selected for improvement, and visual indicia indicating worsening of the items selected for improvement.

The resolution criteria may include visual indicia indicating that the selected item for improvement has been resolved.

The arithmetic logic unit may be configured to determine at least one additional control action that the arithmetic logic unit calculates will improve the plurality of selected items for improvement, and further wherein the arithmetic logic unit is configured to present simultaneously on the display the at least one control action and the at least one additional control action.

In accordance with a first aspect of the invention, a method of operating a driver assistance system for a combine harvester comprises the steps of electronically offering a plurality of general and specific items related to harvested crop for improvement to an operator; electronically receiving from the operator a least two of the general and/or specific items related to harvested crop for improvement selected by the operator; electronically calculating at least one control action that will improve the at least two selected items for improvement; and electronically presenting the at least one control action on an electronic display.

The method further comprises the step of electronically calculating at least one additional control action that will improve the at least two selected items for improvements.

The method may further comprise the step of electronically and simultaneously presenting the at least one control action and the at least one additional control action on the electronic display.

The method may further comprise the step of electronically determining which of the at least one control action and the at least one additional control action will better improve the at least two selected items for improvement received from the operator.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

In the discussion herein the terms "laterally", "side-to-side" and the like refer to a horizontal direction that extends generally perpendicular to a direction of travel of the agricultural combine through the field harvesting crops. Similarly, the terms "forward", "front", and the like refer to a direction that is generally parallel to the direction of travel of the agricultural combine to the field harvesting crops.

Figure 1:
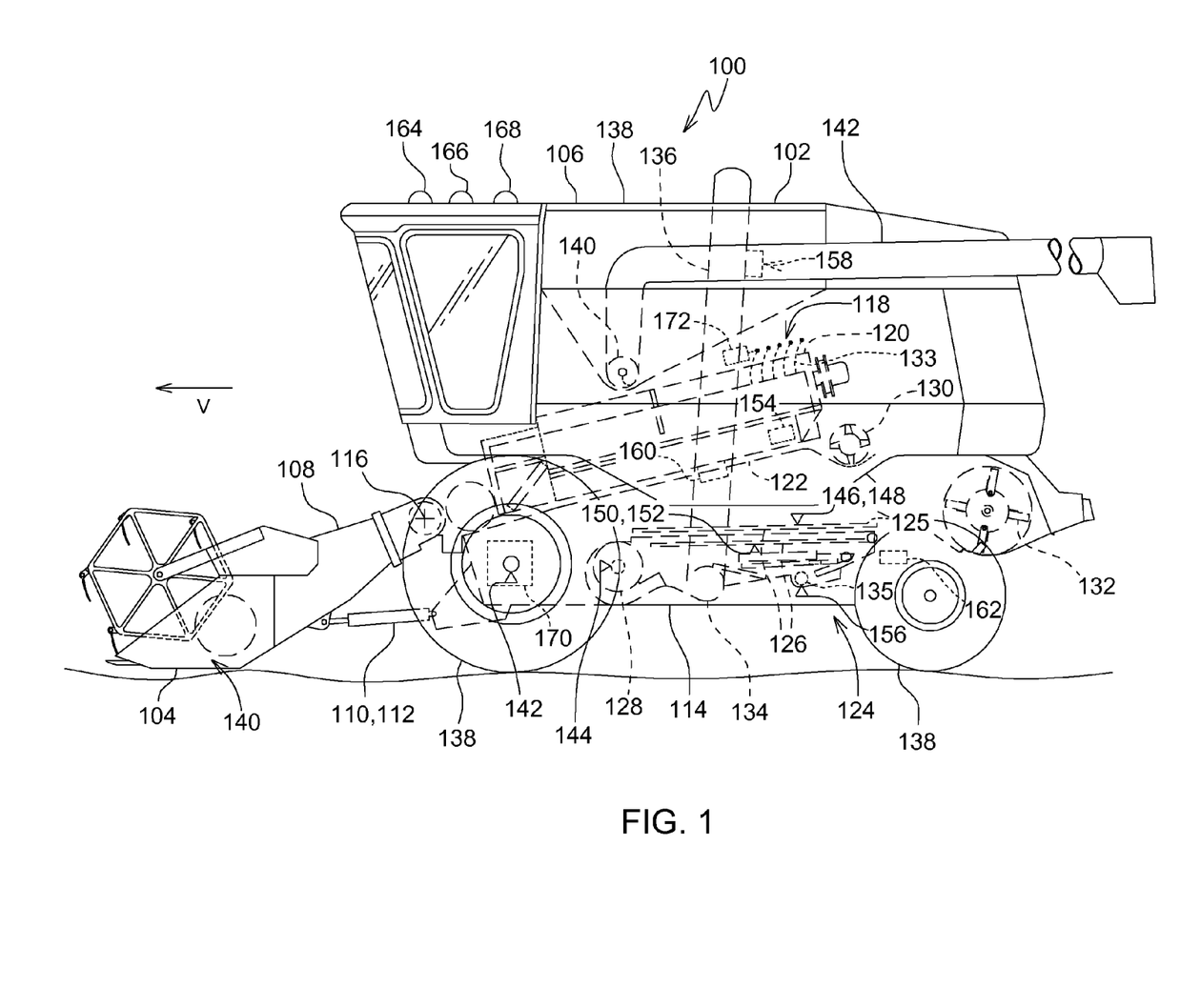
FIG. 1 is a schematic side view of an agricultural working machine in accordance with the present invention.

In FIG. 1, an agricultural harvesting vehicle 100 includes a combine harvester 102 and an agricultural harvesting head 104 supported on a feederhouse 108 pivotally coupled to the front of the combine harvester 102.

A first actuator 110 and a second actuator 112 are coupled to and between the feederhouse 108 and a chassis 114 of the combine harvester 102 to support the forward end of the feederhouse 108 and the agricultural harvesting head 104 above the ground.

When the first actuator 110 and the second actuator 112 are extended, the forward end of the feederhouse 108 and the agricultural harvesting head 104 are raised upward, pivoting clockwise (in FIG. 1) about a pivot joint 116 that couples the feederhouse 108 to the chassis 114.

The combine harvester 102 receives cut crop material from the agricultural harvesting head 104, which is carried up the feederhouse 108 and conveyed into a threshing system 118. The threshing system 118 includes a rotor 120 that rotates against a concave 122. This relative movement separates the grain from the material other than grain (MOG) in the cut crop material. The grain falls downward into a cleaning system 124.

The cleaning system 124 includes a sieve 125 and a chaffer 126. The cleaning system 124 also includes a fan 128 that blows air through the sieve 125 and the chaffer 126. This air levitates light MOG and carries it rearward where it is deposited on the ground.

A beater 130 is provided at the rear of the threshing system 118 to receive the MOG separated from the grain in the threshing system 118. Grain that is further separated from the MOG in the beater 130 falls into the cleaning system 124. The MOG leaves the threshing system 118 and is conveyed backward into a chopper 132, which throws the MOG onto the ground behind the combine harvester 102.

Separator vanes 133 are provided above the upper surface of the rotor 120. The separator vanes 133 are disposed in a generally helical pattern and extend slightly away from the top surface of the rotor 120.

The function of these vanes is to speed up or slow down the cut crop material as it passes between the rotor 120 and the concave 122 in the threshing system 118.

By increasing the angle of the separator vanes with respect to the rotor 120, the cut crop material is conveyed through the rotor 120 and concave 122 faster and thereby experiences less threshing.

By decreasing the angle of the separator vanes with respect to the rotor, the cut crop material is conveyed through the rotor and concave slower and thereby experiences more threshing.

The grain that is cleaned in the cleaning system 124 falls onto a pan that supports a laterally extending clean grain auger 134 that carries the clean grain to one side of the combine harvester 102. An elevator 136 disposed on that one side receives the clean grain from the auger 134 and lifts the clean grain upward. A tailings auger 135 is also provided to the rear of the auger 134 to convey tailings laterally to a second vertical elevator (not shown) that carries tailings up to the forward end of the rotor 120 where they are deposited for re-threshing.

The combine harvester 102 is supported on wheels 138 that carry the combine harvester 102 over the ground harvesting crops. The wheels 138 are driven by motors (not shown).

Several sensors and actuators are provided on the combine harvester 102 to monitor and control, respectively, the working mechanisms of the combine harvester 102.

The sensors and actuators include a header height sensor 140, a ground speed sensor 142, a fan speed sensor 144, a sieve position actuator 146, a sieve position sensor 148, a chaffer position actuator 150, a chaffer position sensor 152, a separator loss sensor 154, a tailings sensor 156, a grain quality sensor 158, a threshing gap actuator 160, a shoe loss sensor 162, a vehicle position sensor (e.g. a GPS sensor) 164, a pitch sensor 166, a roll sensor 168, a motor 170 and a separator vane actuator 172.

The header height sensor 140 senses the height of the header above the ground and provides a signal indicative of this height.

The ground speed sensor 142 senses the speed of the combine harvester vehicle as it travels through the field harvesting crops and provides a signal indicative of this ground speed.

The fan speed sensor 144 senses the speed of the fan 128 and provides a signal indicative of the fan speed.

The sieve position actuator 146 controls the position of the slats that form the sieve 125. By varying the position of the slats, the speed and quantity of the air that passes through the sieve 125 can be varied.

The sieve position sensor 148 senses the position of the slats that form the sieve 125 and generates a signal indicative of the position of the slats of the sieve 125.

The chaffer position actuator 150 controls a position of the slats that form the chaffer 126. By varying the position of the slats, the speed and quantity of the air that passes through the chaffer 126 can be varied.

The chaffer position sensor 152 senses the position of the slats that form the chaffer 126 and generates a signal indicative of the slat position of the chaffer 126.

The separator loss sensor 154 senses grain loss in the threshing system, and in particular the grain that is carried to the rear of the rotor 120 and concave 122.

The tailings sensor 156 detects the amount of tailings that are received at the tailings auger 135.

The grain quality sensor 158 is coupled to the elevator 136 and generates one or more signals. These signals indicate the quality of the grain, which may include the amount (or relative amount) of grain that has been cracked in the threshing process, the contaminants in the grain, and the types of contaminants in the grain, such as small MOG (e.g. chaff and husks), and large MOG (e.g unthreshed grain, sticks, dirt, and cobs).

The threshing gap actuator 160 controls the relative position of the concave 122 with respect to the rotor 120. Typically, it is connected to the concave 122 and moves the concave 122 up and down with respect to the rotor 120 thereby changing the gap between the concave 122 and the rotor 120.

The shoe loss sensor 162 is disposed at the rear the cleaning system 124, and senses the amount of grain that is carried out of the cleaning system 124 and is deposited on the ground. Alternatively, the shoe loss sensor 162 can be disposed within the cleaning system 124 and approximately the same position, such that it senses grain that is saved just before the MOG leaves the cleaning system 124 and is distributed on the ground. The amount of grain that is saved at the rear of the cleaning system 124 is also indicative of the amount of grain that is carried out of the cleaning system 124 and is deposited on the ground.

The pitch sensor 166 is responsive to the degree of pitch of the combine harvester 102 and generates a signal indicative of the pitch of the combine harvester 102.

The roll sensor 168 is responsive to the degree of roll of the combine harvester 102 and generates a signal indicative of the roll of the combine harvester 102.

The motor 170 drives the wheels that support the combine harvester 102.

Figure 2:
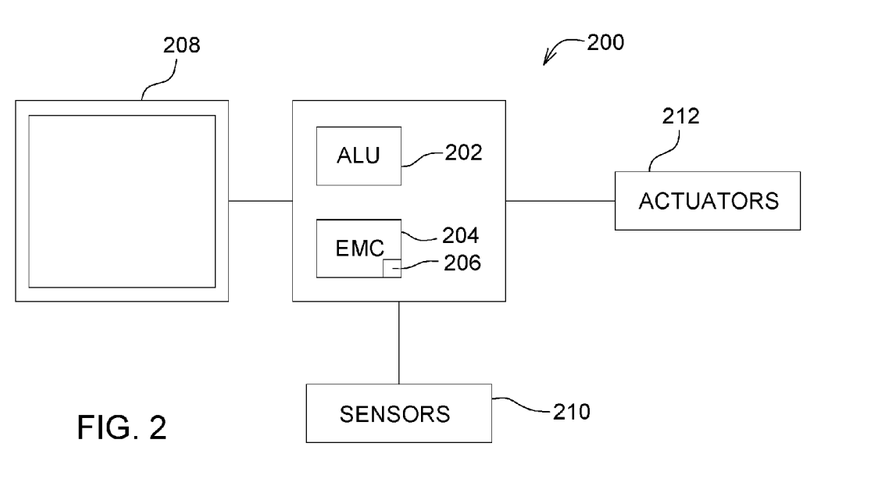
FIG. 2 is a schematic diagram of a driver assistance system of the agricultural working machine of FIG. 1 and FIG. 2.

Referring to FIG. 2, the driver assistance system 200 comprises an arithmetic logic unit (or "ALU") 202, an electronic memory circuit (or "EMC") 204 that stores instructions executed by the ALU 202 and digital data 206 used by the ALU 202 when processing the instructions, a display 208 coupled to the ALU 202 and configured to display a plurality of screens of information provided by the ALU 202 (shown below in FIGS. 4-16). The display 208 includes an input-output device, such as a touchscreen with which the operator can interact to communicate instructions to the ALU 202 (shown below in FIGS. 4-16).

The ALU 202 is configured to retrieve digital instructions and digital data stored in the electronic memory circuit 204, to save digital data to the electronic memory circuit 204, to display screens of information on the display 208, and to retrieve operator commands from the display 208. The digital instructions include instructions to generate the various screens and perform the various computations identified herein. The ALU 202 is coupled to all the sensors identified herein (shown in FIG. 2 as sensors 210) and all the actuators (including the motor 170) which are identified herein (shown in FIG. 2 as actuators 212).

Figure 3:
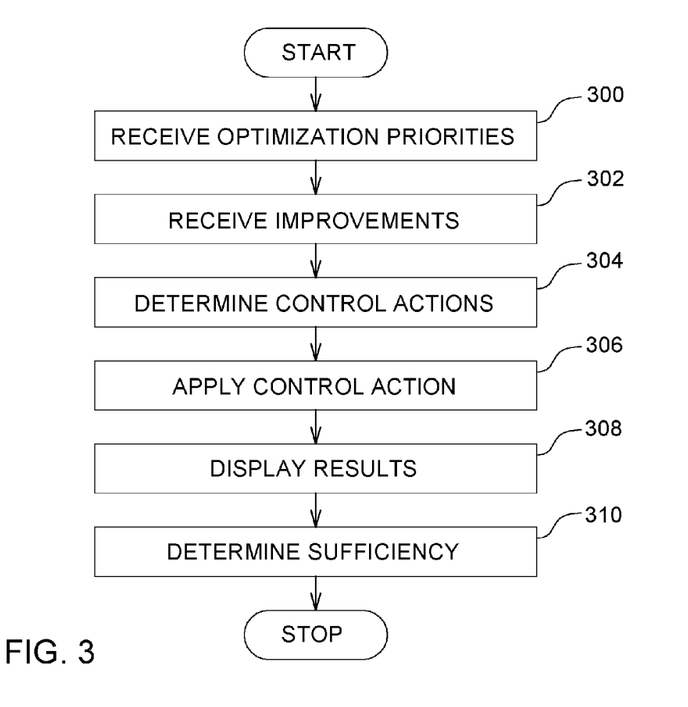
FIG. 3 is a flowchart of a process executed by an arithmetic logic unit (ALU) of the agricultural working machine of FIG. 1 and FIG. 2.

FIG. 3 illustrates a sequence of actions performed by the driver assistance system 200.

In step 300, the ALU 202 is configured to receive optimization priorities entered by the operator. This is discussed in more detail in conjunction with FIG. 7.

In step 302, the ALU 202 is configured to receive one or more desired items for improvement selected by the operator. This is discussed in more detail in conjunction with FIGS. 6, 8, and 9.

In step 304, the ALU 202 is configured to determine one or more control actions based upon the one or more desired items for improvement selected by the operator, to display the control actions to the operator, and to receive the operator's approval to take those control actions. This is discussed in more detail below after the discussion of FIG. 9 and in conjunction with FIG. 10.

In step 306, the ALU 202 is configured to apply the control action that the operator has approved and to wait until the system has reached the steady-state. This is discussed in more detail below in conjunction with FIGS. 10-13.

In step 308, the ALU is configured to display the results of the control action. This is discussed in more detail below in conjunction with FIG. 14.

In step 310, the ALU is configured to determine whether the control action was sufficient to satisfy the one or move desired items for improvement selected by the operator in step 302. This is discussed in more detail below in conjunction with FIG. 15.

Figure 4:
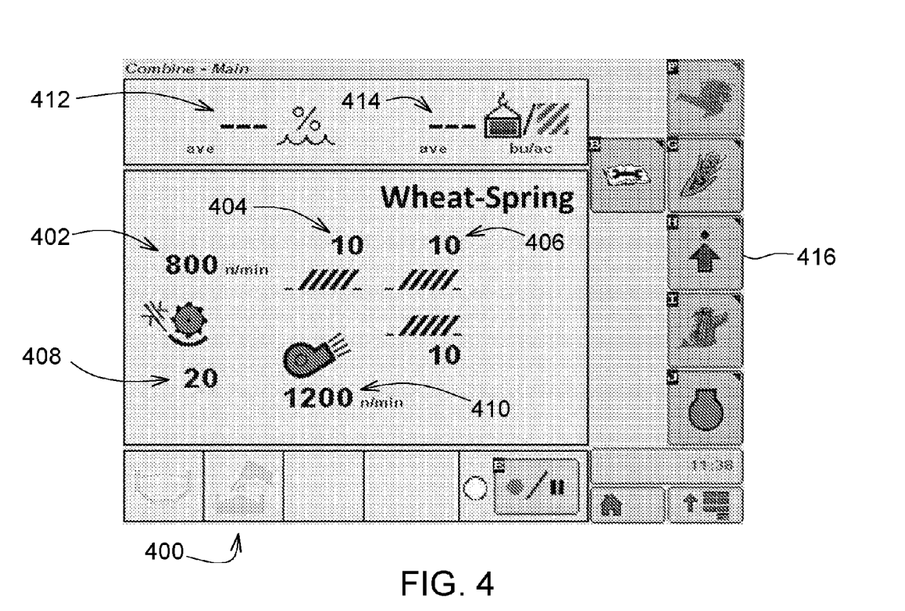
FIGS. 4-16 are screens shown on a display of the driver assistance system of FIG. 2 as it performs the process of FIG. 3.

FIG. 4 illustrates an initial screen 400 provided by the ALU 202 on the display 208. The screen 400 is provided continuously as the agricultural harvesting vehicle 100 travels through the field harvesting crops. The screen 400 has several screen regions that indicate several operational parameters of the agricultural harvesting vehicle 100. It also includes several selectable screen regions that are selected by the operator to indicate the operator's commands. When the operator selects any of the selectable screen regions, a signal is transmitted from the display 208 to the ALU 202 indicating the selection made by the operator.

The operational parameters indicated by the ALU 202 on the screen 400 include the rotor speed in screen region 402, the sieve position in screen region 404, the chaffer position in screen region 406, the rotor/concave spacing in screen region 408, the fan speed in screen region 410, the amount of moisture in the grain in screen region 412, and the amount of grain harvested in region 414. The ALU 202 is configured to dynamically update these operational parameters as the agricultural harvesting vehicle 100 travels through the field. These operational parameters are also displayed on several other screens generated by the ALU 202 including those indicated in FIGS. 8, 9, 10, 11, 12, 13, and 15. This display of operational parameters on several screens is beneficial in that it permits the operator to be aware of the operational status of the combine harvester 102 during the process of optimizing the operation of the combine harvester 102.

The selectable screen regions of the screen 400 include region 416, which the operator selects in order to signal the ALU 202 to execute the steps in FIG. 3. When the operator selects screen region 416, the ALU 202 is configured to display the screen 500 shown in FIG. 5.

Figure 5:
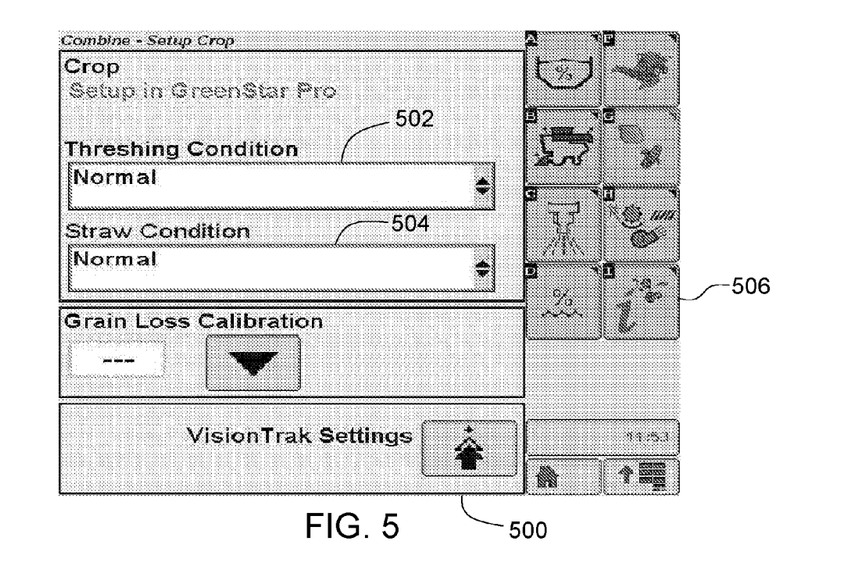

FIG. 5 illustrates the screen 500 provided by the ALU 202 on the display 208. This screen permits the operator to identify a threshing condition and a straw condition before proceeding further. The threshing condition indicated on the screen is stored by the ALU 202 in the electronic memory circuit 204.

The operator can change the threshing condition he perceives by selecting the screen region 502, which is displayed as a drop-down list box indicating a plurality of threshing conditions.

The threshing conditions displayed by the ALU 202 may include "normal", "heavy", "light", "tough", or "easy" or similar words indicating the degree of difficulty the combine harvester 102 has in threshing the crop or the volume of crop that is currently being harvested.

The operator can change the straw condition he perceives by touching the screen region 504, which is displayed as a drop-down list box indicating a plurality of straw conditions.

Whenever the operator selects a threshing condition or a straw condition, the ALU 202 is configured to save data indicative of the selections to the electronic memory circuit 204 for use in subsequent processing.

The selectable screen regions include screen region 506, which the operator selects in order to signal the ALU 202 to continue executing the steps in FIG. 3. When the operator selects screen region 506, the ALU 202 is configured to display a screen 600 on display 208, as shown in FIG. 6.

Figure 6:
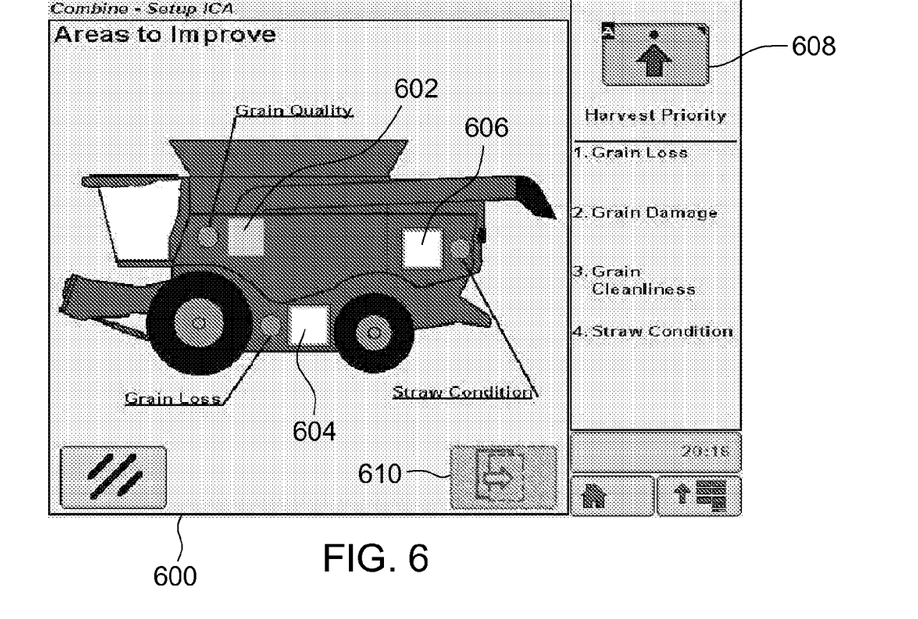

FIG. 6 illustrates the screen 600. The screen 600 permits the operator to select one or more general items for improvement that he wishes the drivers assistance system 200 to make as part of its optimization process. The operator may alternatively select a screen region 608 that permits him to change the optimization priorities used by the ALU 202 when it determines a control action (or prioritized list of control actions) for presentation to an operator as one or more recommendations.

There are three general items for improvement shown on screen 600 that the operator can select. These general items for improvement include grain quality, grain loss, and straw condition.

The operator can select grain quality by selecting screen region 602. The operator can select grain loss by selecting screen region 604. The operator can select straw condition by selecting screen region 606.

Alternatively, the operator can indicate that he wishes to change the optimization priority by selecting screen region 608. If the operator selects screen region 608, the ALU 202 will responsively generate a screen 700 shown in FIG. 7.

Figure 7:
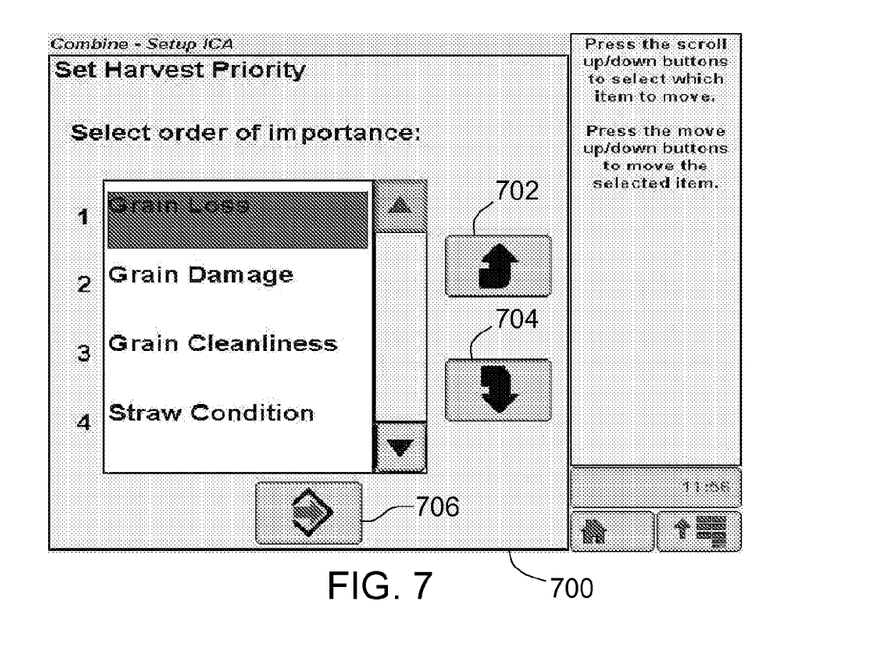

FIG. 7 illustrates the screen 700 provided by the ALU 202 on the display 208. Screen 700 permits the operator to view (and if the operator desires, to change) the optimization priorities (also called "harvest priorities") performed by the driver assistance system 200. The ALU 202 maintains the optimization priorities in the electronic memory circuit 204. The optimization priorities shown here are "grain damage", "grain loss", "grain cleanliness", and "straw condition". These indicate to the ALU 202 the relative importance of the factors of grain damage, grain loss, grain cleanliness, and straw condition when the ALU 202 is determining a control action to be performed.

The operator changes the relative priorities of these factors by selecting a screen region on which the factor name is displayed. This signals the ALU 202 to highlight that factor on the screen. Having highlighted an individual factor, the operator increases its priority by selecting screen region 702. The operator decreases the priority of the highlighted factor by selecting screen region 704. Whenever screen region 702 or screen region 704 are selected by the operator, the ALU 202 responsively reorders the list of factors, and transmits the reordered list to the display 208, correspondingly updating the screen 700. When the operator is satisfied with the priority order of the factors, he selects screen region 706. The ALU 202 is configured to respond to this selection and re-display the screen shown in FIG. 6.

Figure 8:
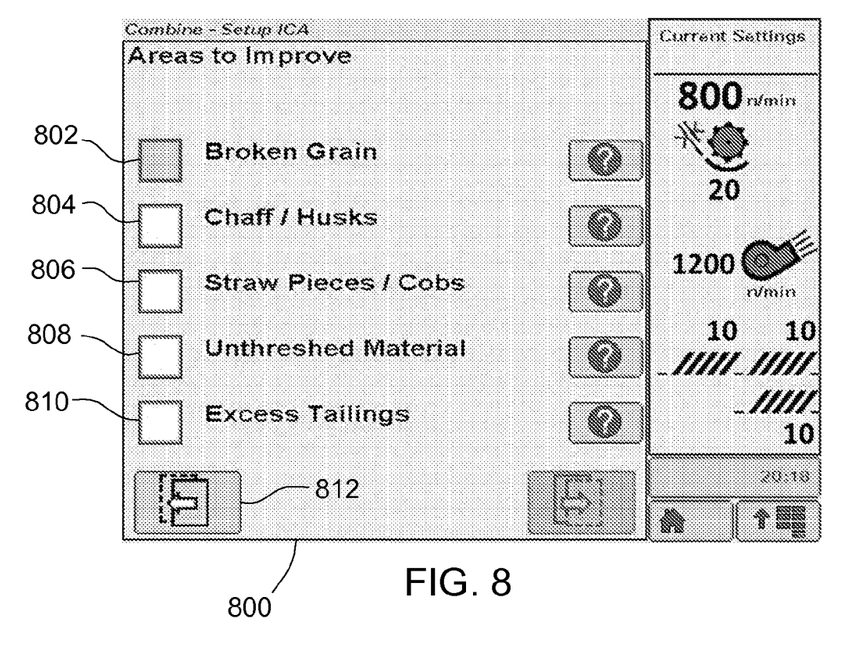

Returning back to FIG. 6, if the operator selects screen region 602, the screen region indicative of grain quality as a general item for improvement, the ALU 202 will responsively generate a screen 800 shown in FIG. 8.

Referring to FIG. 8, the screen 800 includes a list of specific items related to harvested crop for improvement that fall within the general item related to crop for improvement called "grain quality". These specific items for improvement include broken grain, chaff/husks, straw pieces/cobs, unthreshed material, and excess tailings. The operator selects broken grain when he wishes to reduce the proportion of grain broken in the threshing process. The operator selects chaff/husks when he wishes to reduce the amount of chaff and/or husks (i.e. small MOG pieces) that is mixed with the clean grain after threshing. The operator selects straw pieces/cobs when he wishes to reduce the amount of broken straw and or corn cobs (e.g. large MOG pieces) that are mixed with the clean grain after threshing. The operator selects unthreshed material when he wishes to reduce the amount of unthreshed material (e.g. MOG with grain attached) after the threshing process. The operator selects excess tailings when he wishes to reduce the volume of tailings produced by the threshing process.

The operator can select any number of these individual items for improvement by selecting the corresponding selectable screen region 802, 804, 806, 808, and/or 810 located just to the left of the text labels on screen 800.

When the operator has finished selecting all of his desired individual items for improvement (which may include selecting none of them) he selects screen region 812.

When the operator selects screen region 812, the ALU 202 is configured to redisplay screen 600 shown in FIG. 6. The ALU 202 is also configured to indicate that the operator has selected one or more of these individual items for improvement by placing a visual indicator (e.g. a check mark) in screen region 602 of screen 600.

Figure 9:
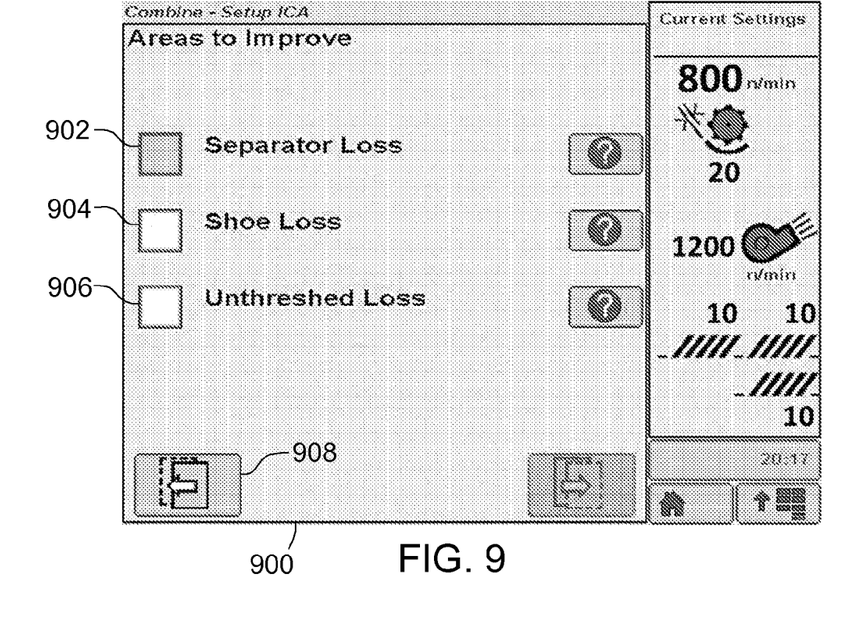

Referring back to FIG. 6, if the operator selects screen region 604, the screen region indicative of grain loss as a general item for improvement, the ALU 202 will responsively generate screen 900 shown in FIG. 9.

Referring to FIG. 9, screen 900 includes a list of specific items for individual areas of improvement that fall within the general item for improvement called "grain loss". These specific items for improvement include separator loss, shoe loss, and unthreshed loss. The operator selects separator loss if he wishes to reduce the amount of grain lost in the threshing process. This loss is sensed by the separator loss sensor 154. The operator selects shoe loss if he wishes to reduce the amount of grain lost by the cleaning shoe. This loss is sensed by shoe loss sensor 162. The operator selects unthreshed loss if he wishes to reduce the amount of unthreshed material (e.g. MOG with grain attached) such as heads of grain or portions of corn cob with corn kernels still attached.

The operator can select any number of these specific items for improvement by selecting the corresponding selectable screen region 902, 904, and 906 located just to the left of the text labels in the screen 900. When the operator is finished selecting all of his desired specific items for improvement (which may include selecting none of them) he selects screen region 908. When the operator selects screen region 908, the ALU 202 is configured to redisplay screen 600 shown in FIG. 6. The ALU 202 is also configured to indicate that the operator has selected one or more of these specific items for improvement by placing a visual indicator (e.g. a checkmark) in the screen region 604.

Referring back to FIG. 6, the final item for improvement that the operator can select is the general item of straw condition by selecting screen region 606. Straw condition is improved by configuring the machine to thresh the cut crop material less vigorously, and thereby produce straw (i.e. MOG) that has a greater length on average. Longer straw is generally preferred over shorter straw when a farmer is selling straw as a product. There are no specific items for improvement defined for straw condition" and therefore no further screen is displayed when the operator selects screen region 606. Instead, the ALU 202 is merely configured to change the screen 600 by placing a visual indicator (e.g. a checkmark) in screen region 606.

Once the operator has finished selecting all the general items for improvement and all the specific items for improvement that he wishes the driver assistance system 200 to improve, he selects screen region 610 in screen 600. When the operator selects region 610, it signals to ALU 202 that the operator has finished the selection process and all of the items for improvement have been identified.

At this point, the ALU 202 has received all of the items for improvement, both general and specific selected by the operator, and has saved them in the electronic memory circuit 204 of the driver assistance system 200. As explained above, the ALU 202 has also received data indicative of the threshing condition and the straw condition (see FIG. 5), as well as the optimization priority of several factors (see FIG. 7).

The ALU 202 then refers to an internal knowledge base or expert system to determine several control actions that it can take to improve many (if not all) of the items for improvement selected by the operator. As part of this process, the ALU 202 preferentially weights some of the possible control actions more than other possible control actions based upon the optimization priorities provided by the operator (see FIG. 7). The ALU 202 further weights some of the possible control actions more than other possible control actions based upon whether a particular control action will beneficially improve more (or all) of the items for improvement selected by the operator. Out of this process, the ALU 202 creates a prioritized list of control actions. When this process is finished, the ALU 202 presents the operator with a screen such as screen 1000 shown in FIG. 10 on display 208.

Figure 10:
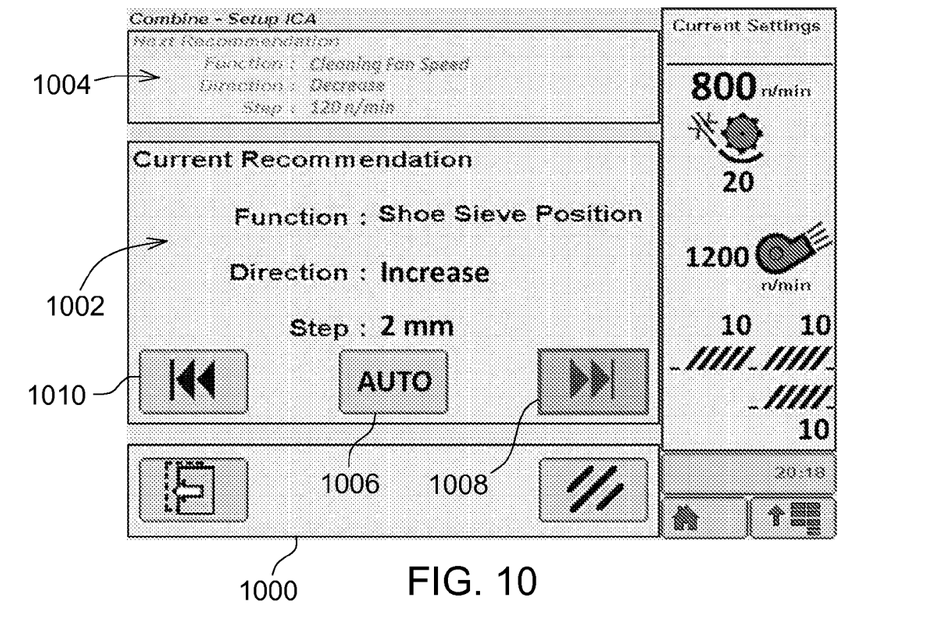

In FIG. 10, the screen 1000 indicates its most preferred control action as a recommendation in a screen region 1002. This recommendation comprises an identification of a working mechanism of the combine harvester 102 whose parameters should be adjusted (in the example of FIG. 10, the sieve 125 position), a direction which that adjustment should be made (in the example of FIG. 10, increasing the spacing between the adjacent slats of the sieve 125), and the magnitude of the adjustment that should be made (in the example of FIG. 10, increasing the spacing of sieve 125 by 2 mm).

The control actions that the ALU 202 can recommend and make include the rotor speed, the rotor-to-concave clearance, the position of the separator vanes 133, the position of the chaffer 126, the position of the sieve 125, the speed of the fan 128, and the forward speed of the combine harvester 102, and the height of the agricultural harvesting head 104 above the ground.

In order to bring about these control actions, the ALU 202 is coupled to and drives the actuators that regulate these working mechanisms (as discussed above in conjunction with FIG. 1).

The screen 1000 also indicates a second most preferred control action in a screen region 1004. Showing an additional control action on the same screen is beneficial because it permits the experienced operator to compare two control actions simultaneously on the same screen, in full detail rather than requiring the operator to page through several screens of control actions to decide which control action to take. This can significantly speed up the process of selecting a control action.

The operator can choose the control action identified in screen region 1002 by selecting a screen region 1006 labeled "AUTO". Alternatively, if the operator does not wish to choose the control action identified in screen region 1002, and wishes to choose the next most preferred control action (which is shown in screen region 1004) or some other control action in the prioritized list of control actions maintained in ALU 202, the operator can select a screen region 1008. Alternatively, if the operator wishes to go back and view a control action recommended by the ALU 202 that the operator has previously viewed, the operator can select a screen region 1010.

In the event the operator selects screen region 1008, the ALU 202 is configured to generate a new screen 1000, in which the second most preferred control action in screen region 1004 is presented in screen region 1002, and the next control action on the prioritized list of control actions is placed in screen region 1004. This process can be repeated numerous times until the operator has viewed all of the control actions in the prioritized list of control actions, or alternatively has chosen a particular control action and selected the screen region 1006.

Figure 11:
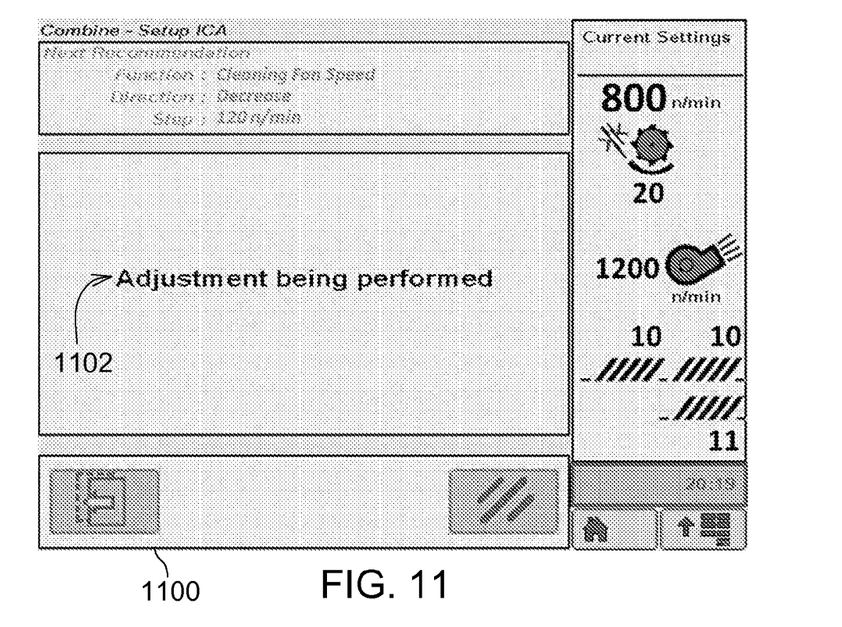

When the operator selects screen region 1006, the ALU 202 responsively displays screen 1100 in FIG. 11 on the display 208.

In FIG. 11, a screen region 1102 notifies the operator that the control action (called "adjustment" in FIG. 11) is being performed. The ALU 202 is configured to flash the screen region 1102 on and off at one second intervals for four seconds in order to get the operator's attention. After this, the ALU 202 automatically displays screen 1200 in FIG. 12 on the display 208.

Figure 12:
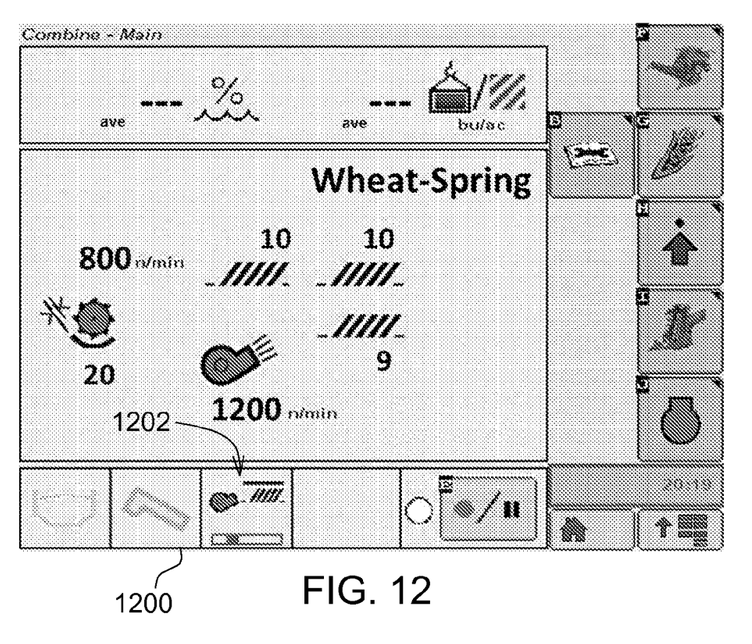

In FIG. 12, a screen region 1202 indicates that the control action is still being made. In particular, a colored bar shown in the screen region 1202 moves back and forth to indicate that the control action is still being made. Once the ALU 202 has determined that the adjustment is complete it then responsively displays screen 1300 in FIG. 13.

Figure 13:
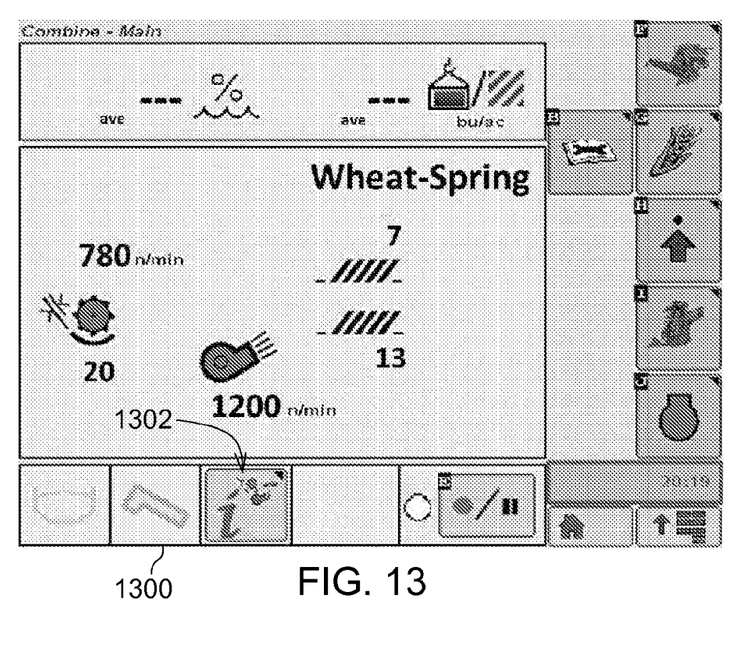

In FIG. 13, the ALU 202 flashes a screen region 1302 on and off until the combine harvester 102 reaches steady-state. This can be a steady-state assumed after a predetermined time interval, such as 30 seconds, for example, or steady-state can be determined by the ALU 202. In this case, the ALU 202 would monitor the sensors (identified in FIG. 1) and wait until one or more of them ceased changing and stay constant, or alternatively, vary within a narrow range of values. In any case, once the ALU 202 determines that a steady-state exists, the ALU 202 stops flashing the screen region 1302. A visual indicia (in screen 1300 it is the letter "I") will remain on the screen region 1302 to indicate that the operator has not yet affirmatively indicated to the driver assistance system 200 that the items for improvement he selected have been made. Nonetheless, the ALU 202 will not take additional control actions (make more adjustments to working mechanisms) until the operator completes the process. When the steady-state has been reached and the screen region 1302 is not flashing, the operator can select the screen region 1302. When the operator selects screen region 1302, the ALU 202 responsively displays screen 1400 of FIG. 14 on display 208.

Figure 14:
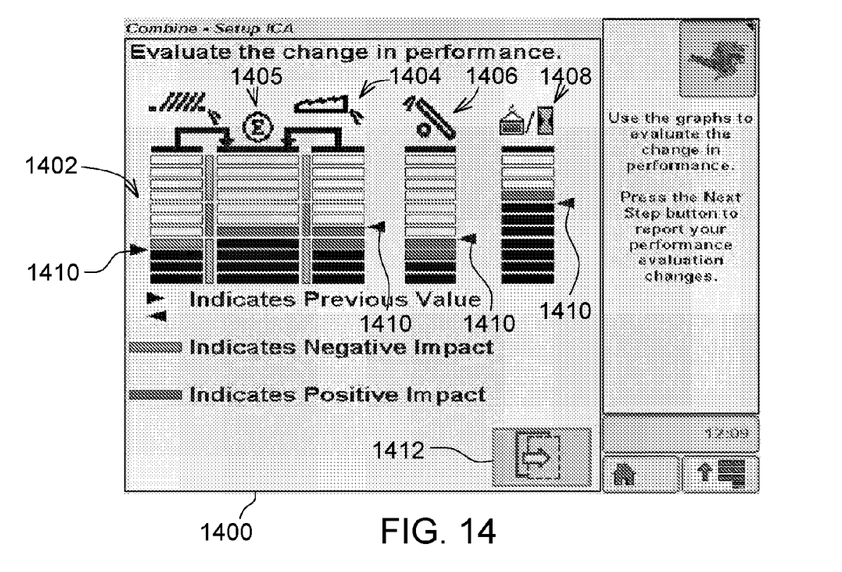

In FIG. 14, the ALU displays several regions indicating the change in performance of the combine harvester 102.

In particular, in screen region 1402, the ALU 202 displays the separator loss in a vertical bar graph form. The higher the illuminated bars extend in screen region 1402, the greater the separator losses. In screen region 1404 the ALU 202 displays the shoe loss in a vertical bar graph form. The higher the illuminated bars extend in screen region 1404, the greater the shoe losses. In screen region 1406, the ALU 202 displays the sum of the shoe losses and the separator losses. In screen region 1405 the ALU 202 displays the volume of tailings. In a screen region 1408, the ALU 202 displays the yield of the machine (e.g. volume of grain per unit area of the field, such as bushels per acre).

The performance prior to the adjustment is indicated by small visual indicia 1410 which indicate to the operator the performance of the combine harvester 102 prior to the immediately previous control action that the ALU 202 suggested and that the operator chose. Whether a change in performance is positive or negative is indicated by the color of the bars in the bar graphs.

The screen shown in FIG. 14 permits the operator to immediately determine what improvements have been made in machines operation by the last control action.

Having viewed the screen 1400, the operator may at any time select a screen region 1412. When the operator selects screen region 1412, the ALU 202 responsively displays a screen 1500 in FIG. 15.

Figure 15:
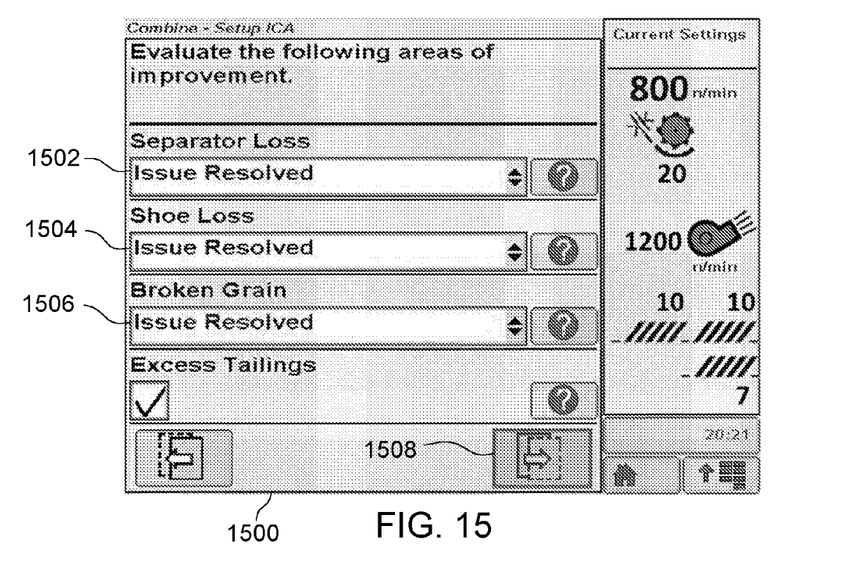
Figure 16:
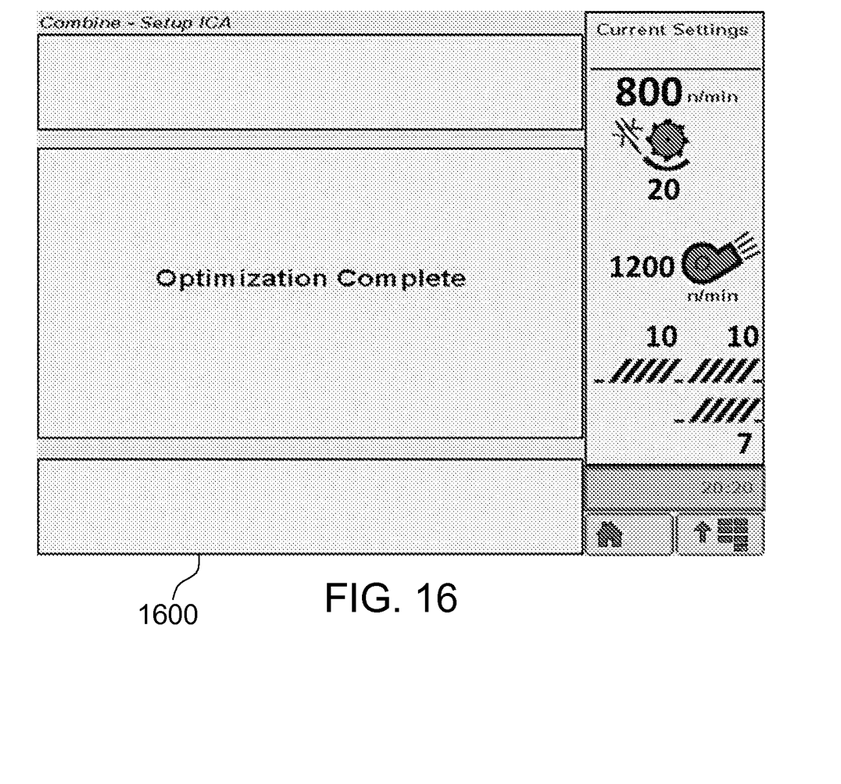

In FIG. 15, the ALU 202 displays all of the items for improvement that the operator selected in screen 800 of FIG. 8 and screen 900 of FIG. 9. Each of the items for improvement the operator selected is are shown in list form on screen 1500. The items for improvement are identified by the terms the operator selected in screen 800 and screen 900. The example of FIG. 15 shows what would be displayed if the operator had selected "separator loss", "shoe loss", "broken grain", and "excess tailings". Each of the items for improvement in screen 1500 is associated with a corresponding drop-down list box located immediately below the name of the items for improvement. Thus, the "separator loss" item for improvement has a drop-down list box shown in a screen region 1502, the "shoe loss" area of improvement has a drop-down list box shown in a screen region 1504, and the "broken grain" area of improvement has a list box shown in a screen region 1506.

When any one of these screen regions is selected, the ALU 202 generates the drop-down list box on the screen 1500. The drop-down list box offers the operator several choices by which he characterizes changes to the item for improvement and also indicates whether no further improvement is required.

These list box choices include "issue resolved" (which is the initial default value automatically generated by ALU 202), "better", "worse", and "same".

If the operator selects "issue resolved", the operator signals the ALU 202 that the associated item for improvement now needs no more improvement and he is satisfied with the results produced by the last control action. If the operator selects "better", the operator signals the ALU 202 that there is been some improvement in the item for improvement by the last control action, but that he would like more improvement. If the operator selects "same" the operator signals the ALU 202 that there has been no significant change made in that item for improvement by the last control action and that he would like more improvement. If the operator selects "worse" the operator signals the ALU 202 that there has been no improvement, but that the item for improvement has gotten worse.

Once the operator has characterized all of the items for improvement either by selecting a drop-down box, or by accepting the default designation of "issue resolved", the operator can then select a screen region 1508. At this point, the ALU 202 responsively compares all of the operator's selections in screen 1500 (including the default selection of "issue resolved" if the operator has changed nothing) to determine whether any item for improvement is not resolved. If at least one item for improvement is not resolved, the ALU 202 responsively re-displays the screen 1000 in FIG. 10. In this case, however, since the operator previously chose at least one control action, the ALU 202 displays the next control action that it retrieves from its prioritized list of control actions. In this manner, the operator can repeat the process of selecting control actions recommended by the ALU 202 just as described above in conjunction with FIG. 10, without having to return to screen 600 in FIG. 6 and reselect each item for improvement all over again.

This process of resolving multiple items for improvement sequentially using a prioritized list of control actions (i.e. the ALU 202 processes associated with FIG. 10 through FIG. 15)

is repeated until the operator indicates that all of the items for improvement have been resolved. At this point, the ALU 202 indicates that the optimization process is complete by displaying a screen 1600 in FIG. 16.

A single ALU 202 was described above. The ALU 202 can comprise two or more ALUs that are connected together in a computer network. Each of the ALUs in the computer network can perform one or more of the functions identified above for ALU 202.

We claim:

1. A driver assistance system for a combine harvester that comprises:
    a display;
    a plurality of adjustable working mechanisms of the combine harvester which process crop material passing through the combine harvester, with each working mechanism having an associated working parameter changed by adjusting the working mechanism;
    a plurality of actuators respectively coupled for selectively adjusting the working mechanisms for changing the associated working parameter;
    a plurality of sensors respectively associated with the working mechanisms for sensing the associated working parameters;
    an arithmetic logic unit coupled for selectively controlling the plurality of actuators of the plurality of working mechanisms for selectively controlling the associated working parameters, to the plurality of sensors for receiving the sensed working parameters and to the display for providing information to the operator;
    wherein the arithmetic logic unit includes an electronic memory circuit storing the sensed working parameters and updates these working parameters during operation of the combine harvester, that stores instructions executed by the arithmetic logic unit and stores digital data used by the arithmetic logic unit when processing the instructions;
    wherein the display includes an input/output device with which an operator can interact to communicate instructions to the arithmetic logic unit and provides a list of a plurality of general items related to processed crop material together with a list of a plurality of specific items, respectively related to the plurality of general items, with an operator being able to select a plurality of items from the plurality of general and individual items for improvement;
    wherein each of the plurality of general and specific items for improvement being capable of being improved by adjusting at least one of the working mechanisms for changing the associated working parameter of the at least one of the working mechanisms;
    wherein the arithmetic logic unit is configured to electronically accept from the operator at least two items for improvement selected by the operator from the list of general and specific items for improvement;
    wherein the electronic memory circuit contains an internal knowledge base to which the arithmetic logic unit may refer to determine control actions to be taken to improve items selected for improvement; and
    wherein the arithmetic logic unit is configured to act, in response to electronically receiving from the operator the at least two items for improvement, to determine at least one control action for controlling at least one actuator for changing the working parameter of at least one working mechanism to a first pre-selected adjusted working parameter that the arithmetic logic unit calculates will improve the at least two items selected for improvement by the operator.

2. The driver assistance system of claim 1, wherein the at least one control action comprises a plurality of control actions, for respectively changing a plurality of working parameters of a plurality of working mechanisms by respectively controlling a plurality of actuators respectively coupled for adjusting the plurality of the working mechanisms for respectively changing the working parameters of the plurality of working mechanisms to a pre-selected plurality of adjusted working parameters, that the arithmetic logic unit calculates will improve the at least two items selected by the operator for improvement, and wherein the arithmetic logic unit is configured to prioritize individual control actions of the plurality of control actions based upon a degree to which the individual control actions will most improve the at least two items for improvement selected by the operator.

3. The driver assistance system of claim 1, wherein the arithmetic logic unit is configured to simultaneously present on the display each of the at least two items previously selected by the operator for improvement.

4. The driver assistance system of claim 1, wherein the arithmetic logic unit is configured to present resolution criteria for each of the items for improvement on the display.

5. The driver assistance system of claim 4, wherein the resolution criteria include visual indicia indicating improvement for each of the items for improvement on the display, and visual criteria indicating worsening for each of the items for improvement on the display.

6. The driver assistance system of claim 4, wherein the resolution criteria include visual indicia indicating that the items for improvement have been improved and therefore have been resolved.

7. The driver assistance system of claim 1, wherein the arithmetic logic unit is configured to determine at least one additional control action that the arithmetic logic unit calculates will improve the at least two items selected for improvement by the operator, and further wherein the arithmetic logic unit is configured to present simultaneously on the display the at least one control action and the at least one additional control action.

8. A method of operating a driver assistance system for a combine harvester including a plurality of working mechanisms which process crop material passing through the combine harvester and which include a plurality of actuators respectively connected to the plurality of working mechanisms for adjusting working parameters of the working mechanisms, comprising the steps of:
    providing an operator with an electronic menu containing an itemized list of a plurality of general items related to the crop material together with a list of a plurality of specific items, respectively related to the plurality of general items, with the menu being configured such that the operator can select a plurality of items from the plurality of general and specific items for improvement;
    electronically receiving from the operator at least two items for improvement selected by the operator from the itemized list of general and specific items related to the crop material;
    electronically receiving information relating to the parameters of the combine harvester working mechanisms which process the crop material passing through the combine harvester and are involved in generating the plurality of items related to the crop material for improvement from the itemized list;
    electronically calculating at least one control action, based on the information electronically received relating to the working mechanisms involved in generating the items for improvement, that will improve the at least two selected items for improvement by adjusting at least one of the working mechanisms for changing the working parameter of the at least one working mechanism to a pre-selected adjusted working parameter; and electronically presenting the at least one control action on an electronic display.

9. The method of operating a driver assistance system of claim 8, further comprising the step of electronically calculating at least one additional control action that will improve the at least two items for improvement selected by the operator by adjusting at least one additional working mechanism for changing the working parameter of the at least one additional working mechanism to a pre-selected adjusted working parameter.

10. The method of operating the driver assistance system of claim 9, further comprising the step of electronically and simultaneously presenting the at least one control action including the pre-selected adjusted working parameter of the at least one working mechanism and the at least one additional control action including the pre-selected adjusted working parameter of the at least one additional working mechanism on the electronic display.

11. The method of operating the driver assistance system of claim 9, further comprising the step of electronically determining which of the at least one control action and the at least one additional control action will better improve the at least two selected items for improvement received from the operator.

* * * * *